COMPUTER CONTROL SYSTEM

Filed Aug. 25, 1961 3 Sheets-Sheet 1

INVENTORS
CHARLES E. OWEN
ANTONY PEACOCK
DANIEL M. TAUB
BY Ronald J. Kransdorf
AGENT Sept. 13, 1966 C. E. OWEN ET AL 3,273,126

COMPUTER CONTROL SYSTEM

Filed Aug. 25, 1961 3 Sheets-Sheet 3

3,273,126
Patented Sept. 13, 1966

1

3,273,126
COMPUTER CONTROL SYSTEM

Charles Edward Owen, Chandlers Ford, Antony Peacock, St. Giles Hill, Winchester, and Daniel M. Taub, Winchester, England, assignors to International Business Machines Corporation, New York, N.Y., a corporation of New York Filed Aug. 25, 1961, Ser. No. 133,867
6 Claims. (Cl. 340—172.5)

This invention relates to computer control systems and, more particularly, to such control systems employing a matrix of bistable elements for generating control signals.

A computer is generally designed to be capable of performing a given number of mathematical operations in response to programmed orders fed into the computer from peripheral input equipment. By feeding these orders into the computer in a particular sequence, the computer can be programmed to solve a problem or to perform any other desired function.

The execution of a program order usually involves more than one step. There is a certain analogy between the way in which the computer performs the individual steps required for the execution of an order and the way in which it performs the individual orders required for the execution of a program. For this reason, the term "micro-program" will be used when referring to these steps and the term "micro-programming" will be used when referring to the process of setting up a sequence of these steps.

The sequencing of these steps and the steps themselves for the micro-program of some orders will be the same for each occurrence of the order. An example of this would be a transfer order, such as, "Clear the accumulator and add the contents of address $x$ into it."

But for most orders, there will be at least one place in the micro-program where the next step to be performed will depend on the result of the previous step, or on some other computer condition. An example of the first of these possibilities would be a jump instruction, such as, "If the accumultor is positive, take the next order from the address register, but, if the accumulator is negative, jump to address $x$ for the next order." The first step in the micro-program of this order would be to sample the sign bit of the number stored in the accumulator. The second step of this micro-program would be to sample a memory address to obtain the next order, the particular address sampled depending on the result of the previous step. An example of the second possibility mentioned above would be a multiply instruction where the digits of the multiplier are examined one by one and, if the particular digit being examined is found to be a "1," the multiplicand is added to the number in the accumulator, the number in the accumulator shifted one place to the right, and the next digit of the multiplier examined; whereas, if the digit is found to be a "0," the number in the accumultor is shifted without the addition of the multiplicand taking place and the next digit in the multiplier examined. These situations in the micro-programs where a decision has to be made to take one of two or more possible steps will be referred to as "branches" in the micro-program, and the process of making these decisions, as "branching."

In a parallel machine, each step required for the execution of an order is accomplished by the application of a pulse to a set of gates; it is the function of the control unit of the computer to produce the sequence of pulses necessary for this purpose. In many computers, the design of the control unit has been arrived at by semi-empirical methods and the resulting circuits, however effective they may be, are complex and non-systematic and would require considerable alteration if any appre-

2 ciable change were to be made in the order code of the computer. Particularly troublesome have been the orders, such as those described above, which required two-way, and sometimes even four-way, branching at some point in their micro-program.

It is, therefore, an object of this invention to provide improved means for sequencing the micro-program steps of a computer in an orderly, systematic manner.

Another object of the invention is to provide a control circuit of the type described above which is relatively simple and flexible so that it may easily be altered when changes in the order code of the computer are made.

A more specific object of this invention is to provide improved means for determining which of the possible steps is the next step to be performed when a branch occurs in a micro-program.

Another object of this invention is to provide means for simply and systematically performing the branching operations in a micro-program.

A still more specific object of this invention is to provide means for combining information of the last step performed with either the results of this step, other information in the computer, or information fed into the means from some external source to determine which micro-program branch the next step will be in.

In control devices for computers of the type using a plurality of elements capable of generating a plurality of output signals in response to an applied input signal, for example, magnetic cores, these cores are initially set in some way to a stable condition. In the preferred embodiments of the invention, the cores are arranged in matrix form and a drive winding provided for each row and each column of cores. There is a unique pair of drive windings one row and one column winding for each core, and a core is driven out of its initial stable condition only in response to the combined excitation of the pair of drive windings associated with it.

In accordance with the above objects, the magnetic cores in this invention are divided into at least two groups, there being a set of row and a set of column drive windings associated with each of these groups. For each core of a given group, there will be a corresponding core in each other core group. In operation, a pair of drive windings are selected and energized by external program means to switch a core in the matrix corresponding to the first step of the micro-program for the programmed order. The switching of this core induces outputs pulses in all the sense windings linking this core. Some of these pulses are used to energize gates, causing the desired step to be performed; others of these pulses are fed to row-group-selector circuits or column-group-selector circuits, or both, where they are compared with signals representing some computer condition (such as the content of some register or the result of the previous step), the operator, or some input equipment to the computer, to determine the group in which the next core to be selected will be located; and the remainder of the pulses are fed to address-selector circuits where they are decoded to determine the address in the selected group of the next core to be switched. This core would correspond to the next step to be performed in the micro-program. This procedure is repeated, branching being accomplished by varying the group in which the selected core is located, until the micro-program for the order is completed and control is then returned to the regular program.

The foregoing and other objects, features and advantages of the invention will be apparent from the following more particular description of a preferred embodiment of the invention, as illustrated in the accompanying drawings.

In order to more clearly illustrate the concepts of this invention, the illustrative embodiment shown in FIG. 1 will now be described in detail. The chief purpose of this circuit is to organize the flow of information in the computer by opening gates and inserting constants, etc. Each particular machine operation is initiated by a control signal, there being 46 control signals required in the illustrative embodiment. It should also be noted that the same micro-program step may be required in more than one program order and that the same computer operation will generally be required in more than one micro-program step.

Figure 1:
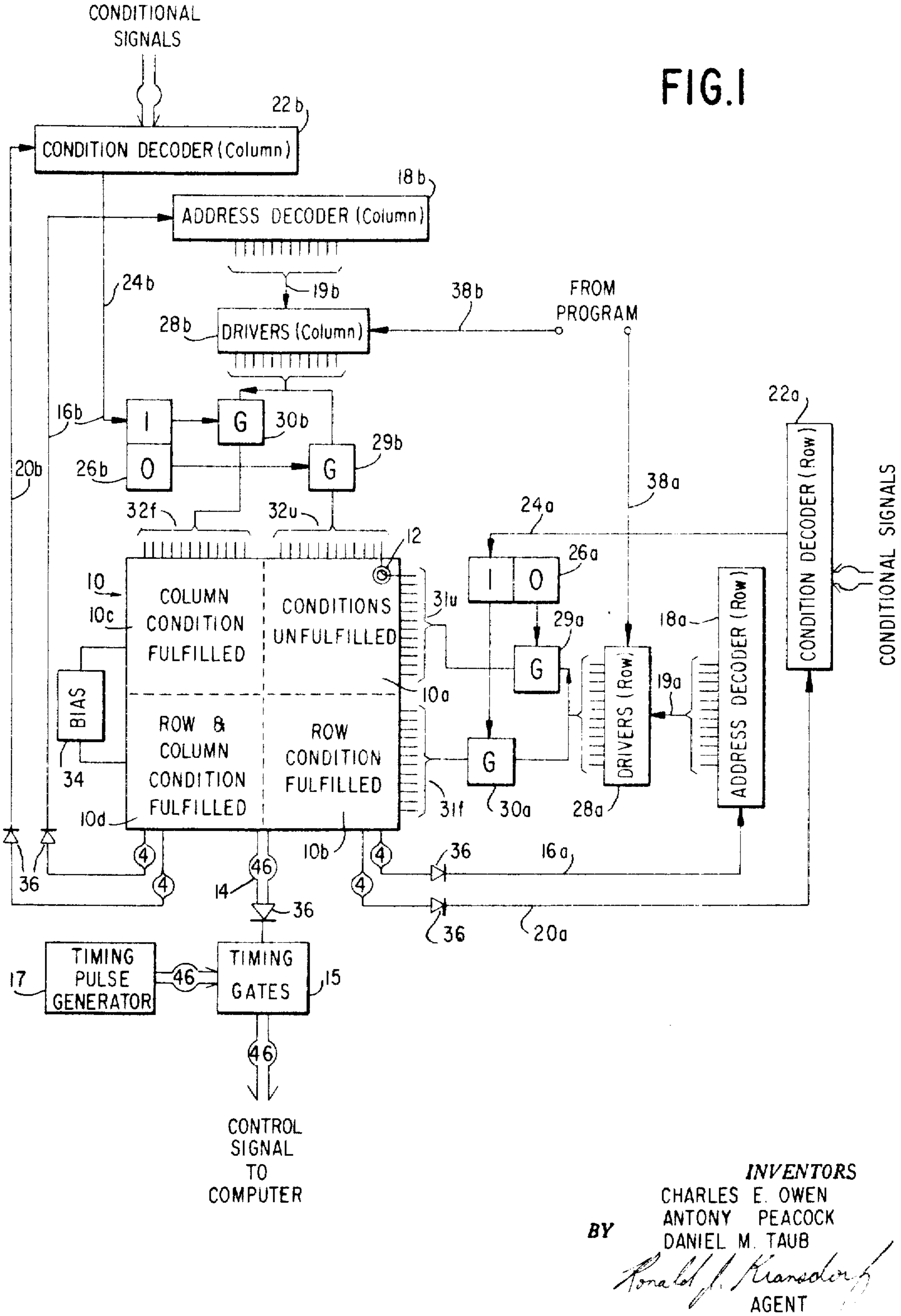
FIG. 1 is a block diagram of a computer control circuit embodying the concepts of this invention.

Referring to FIG. 1, the circuit includes a control matrix 10 made up of 576 magnetic cores 12, arranged in rows and columns of 24 cores each. Each of these control matrix cores corresponds to a particular micro-program step. The control-matrix cores are divided into four groups which, for reasons which will be apparent later, are designated: the conditions unfulfilled group 10*a*; the row-condition fulfilled group 10*b*; the column-condition fulfilled group 10*c*; and the row-and-column-condition fulfilled group 10*d*. The control matrix is threaded by 46 sense windings 14, one for each of the control signals. As was mentioned before, a particular computer operation will generally be required in more than one micro-program step. Therefore, each sense winding will pass through all the cores in the matrix 10 corresponding to micro-program steps requiring the operation controlled by the control signal of that sense line. Since an average of about four operations are performed during each micro-program step, each core is linked by an average of four of these sense windings. Since all the operations of a micro-program step are not generally performed simultaneously, a group of timing gates or triggers 15 are provided in series with the output sense windings 14. These gates are selectively strobed by timed pulses from timing pulse generator 17 to supply the control signals to the computer at the proper time in the step cycle.

In order to achieve a sequence of signals from the control matrix 10, sixteen additional sense windings are used. These sense windings allow the selected core to supply the address for the next core in the sequence. Four of these sense winding 16*a* are applied to a row address decoder 18*a*. The binary coded information on these lines is decoded, in a manner which will be described in detail later, to give an output on one of twelve address lines 19*a*. Four of these sense windings 20*a* are fed into row condition decoder 22*a*, where they are compared with conditional signals in a manner to be considered in more detail later and, where the condition is fulfilled, an output appears on line 24*a* to switch single-shot trigger 26*a* to its on or "1" state. The conditional signals may come from the computer (either as the result of some previous step in the micro-program, or as the contents of some computer register, etc.), the operator, or some piece of peripheral input-output equipment.

Each address line 19*a* when energized, triggers a corresponding row driver 28*a*. When trigger 26*a* is in its "0" state, gate 29*a* will be conditioned so as to cause a row drive winding in the row-condition unfilled set of drive windings 31*u* to be energized, and gate 30*a* will be conditioned. But when trigger 26*a* is in its "1" state, gate 30*a* will be the one conditioned so that the corresponding row drive winding in the row-condition fulfilled set of row drive windings 31*f* will be energized.

Column address windings 16*b* and column condition windings 20*b* operate in a manner identical to that described above for the corresponding row windings to cause the proper column drive windings in the column drive winding sets 32*u* and 32*f* to be selected for the next micro-program step.

The triggers 26*a* and 26*b*, being single-shot triggers, return to their "0" states at the end of each step cycle. If other than single-shot triggers are used, a reset pulse may be applied to these triggers at the end of each step cycle. A source of bias voltage 34 is also provided to normally maintain the cores of the control matrix in their unswitched condition. This bias may be continuously applied, or may, as will be seen later, be applied only at selected times in a step cycle to inhibit the switching of undesired cores and to reset switched cores. When the row and column drive windings linking a particular core 12 are simultaneously energized, the inhibiting effect of the bias signal is overcome and the core is switched; the energizing of either the row drive winding or the column drive winding alone would not supply sufficient energy to the core to overcome the inhibiting action of its bias signal and the core would remain in its unswitched condition. If the bias signal is continuously applied, the core is returned to its unswitched condition by the bias signal as soon as energy is removed from the drive windings.

Each of the sense windings 14, 16*a*, 16*b*, 20*a* and 20*b* has a diode 36 connected in series with it. If these diodes are oriented in one polarity, the output signals induced on the sense windings when a core 12 is switched will be passed to their respective gates and decoders and the output signal induced on these sense lines when the core is reset will be blocked. If these diodes are oriented in the opposite polarity, the converse will be true.

It will be remembered that, at the end of each program order, control is shifted back to the program to select the next core 12 to be switched, this core being the one corresponding to the first micro-program step in the next program order. This may be accomplished in the circuit of FIG. 1 by either (*a*) having a routine which is common to all micro-programs, the last step in each micro-program selecting the core corresponding to the first step in the subroutine which subroutine controls the selection of the first core for the next program order; or (*b*) by switching a core 12 at the end of each micro-program which core has no sense windings 16*a*, 16*b*, 20*a* or 20*b* passing through it and whose output winding 14 conditions a gate (not shown) to pass binary coded information from the program to lines 38*a* and 38*b*. The information is applied directly to trigger drives 28*a* and 28*b* respectively, in the same manner as for the information appearing on lines 19*a* and 19*b*.

Figure 2:
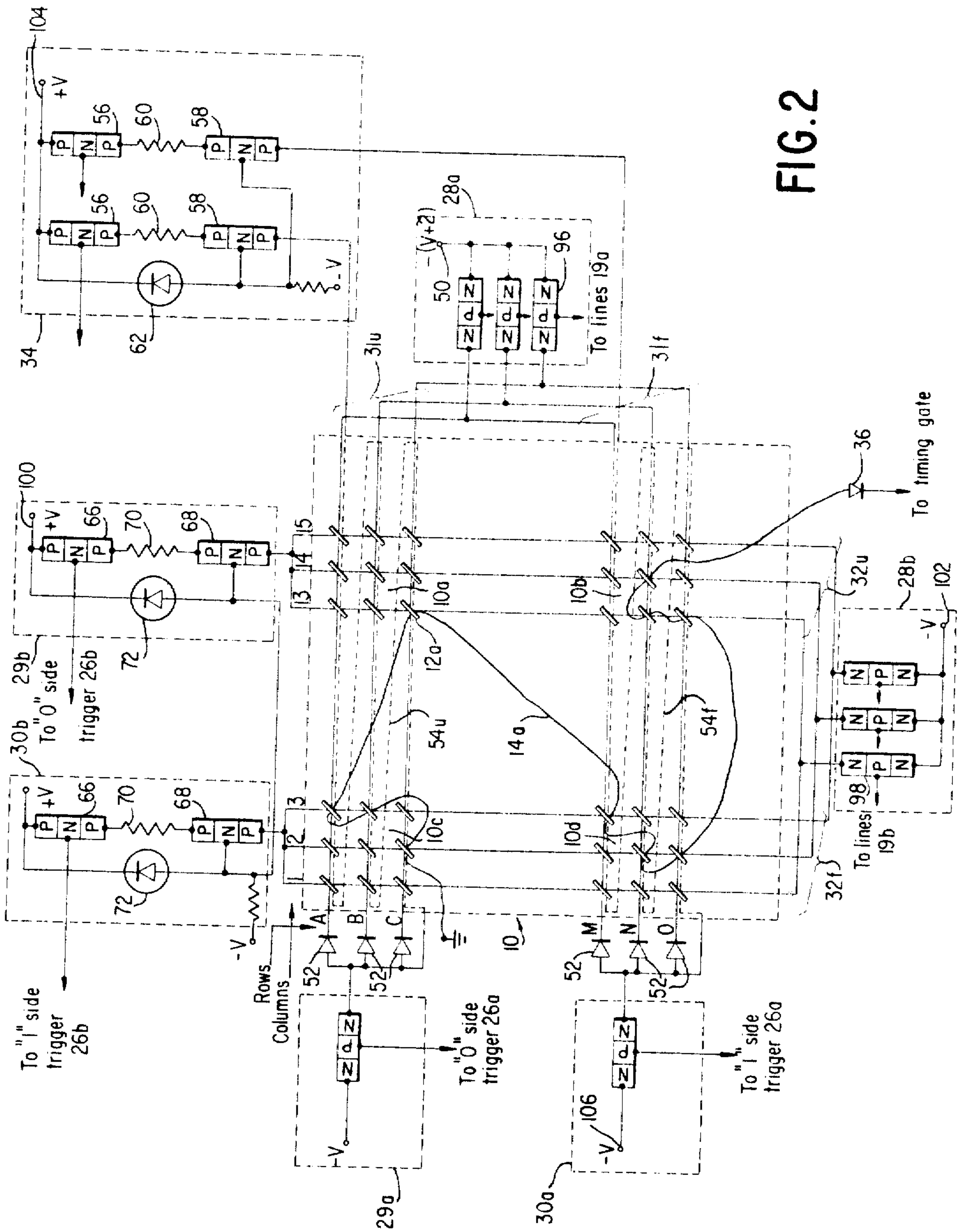
FIG. 2 is a partial circuit diagram of the control matrix, drivers, biasing network and gates for the circuit shown in FIG. 1.

Referring now to FIG. 2, there is shown in more detail the control matrix 10, the drivers 28*a* and 28*b*, the gates 29*a*, 29*b*, 30*a* and 30*b*, the drive winding sets 31*u*, 31*f*, 32*u* and 32*f*, and the bias source 34. To simplify drawing, only 36 of the 576 control cores 12 are shown in this figure; and to further simplify the drawing, only three drive windings of each drive winding set are shown. In the following description, these windings will be referred to as follows: the three windings of the row-condition unfulfilled set 31*u* will be designated A, B, C; those of the row-condition fulfilled set 31*f* as M, N, O; those of the column-condition unfulfilled group 32*u* as 13, 14, 15; and those of the column-condition fulfilled set 32*f* as 1, 2, 3.

The row drivers 28*a* are shown as being NPN transistors, the bases of which are connected to associated address lines 19*a* (FIG. 1) from address decoder 18*a*. The emitters of these transistors are connected together and are maintained at a negative potential by negative potential source 50. The collectors of these transistors are connected to the row drive windings, the same transistor being used to drive windings A and M, B and N, C and O, etc.

Therefore, when an address line 19*a* turns on one of the transistors of the row driver 28*a*, the transistor will attempt to energize the row drive windings occupying the corresponding positions in the row condition fulfilled and the row condition unfulfilled sets. The other end of each raw drive winding is connected to the cathode of a diode 52, the anodes of the diodes for each set of drive windings being connected together to the emitter of an NPN transistor, which transistors form the gates *29a* and 30*a*. These NPN transistors are biased to normally be conducting and are turned off when a signal from trigger 26*a* (FIG. 1) is applied to them. The common anodes of the diodes 52 are also connected respectively to bias windings 54*u* and 54*f*. Each of these bias windings passes through half of the cores 12 of the control matrix in a direction opposite to the direction of the row drive windings. These bias windings terminate in the constant-current bias source 34. The bias source is made up of two identical legs, each comprising two PNP transistors 56 and 58 separated by a resistor 60, these legs both sharing a common zener diode 62. The transistors 56 act as switches, being turned on by positive pulses (or potential levels) from the computer, while the transistors 58 have their bases held at a constant potential by the zener diode to eliminate power supply variations.

The column drive windings 13–15, etc. of the column-condition unfulfilled set 32*u* are terminated in a gate *29b* and the column drive windings 1–3, etc., of the column condition fulfilled set 32*f* are terminated in a gate 30*b*. These gates each resemble one leg of the bias source 34, consisting of two PNP transistors 66 and 68 in series separated by a resistor 70 and having a zener diode 72 in parallel with the series combination. Depending on the condition of trigger 26*b*, a positive signal will be applied to either the switch-transistor 66 of gate *29b* or 30*b* to allow current to flow through the selected column drive winding connected in series therewith. As with the bias source, the bases of transistors 68 are held at a constant potential by the zener diodes to eliminate power supply variations.

A single one 14*a* of the 46 sense windings 14 is shown for the sake of illustration in FIG. 2. It is seen that this sense winding links a number of cores 12 in each of the four core groups. In the full 576 core matrix, it is possible for a single sense winding to pass through as many as 200 cores. The cores which a particular sense winding passes through will depend on the logical operation its output signal causes to be performed and on the micro-program steps which require this operation. It will also be noted that the sense winding 14*a* links approximately an equal number of cores in each sense. This is to cancel noise signals which may be induced in the sense winding by half-selected cores.

Figure 3:
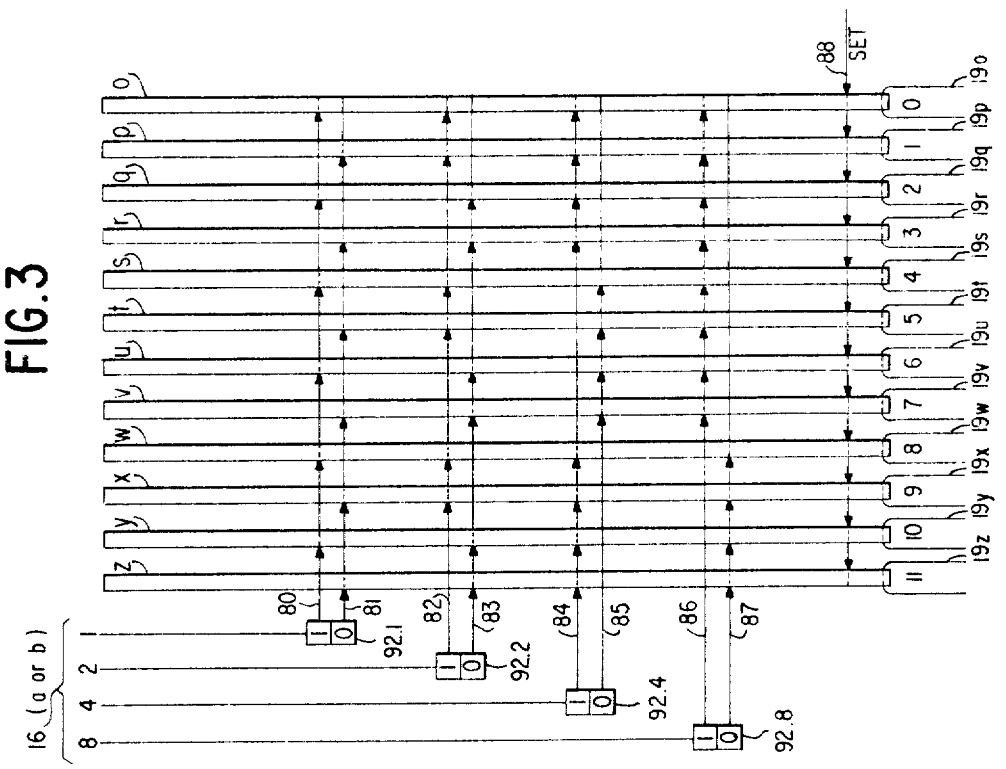
FIG. 3 is a circuit diagram of an address decoder suitable for use in the circuit of FIG. 1.

The decoders 18*a*, 18*b*, 22*a* and 22*b* may be of any suitable type; however, for the sake of illustration in the forthcoming description of the operation of the circuit, a particular circuit suitable for use as these decoders is shown in FIG. 3. This decoder is particularly adapted to serve as an address decoder but may be easily modified to serve as a condition decoder as well. The rectangles *o–z* in this figure represent magnetic cores, all of which are initially in the same stable state. A positive signal applied to an input winding passing through a core will, if the arrow on that input winding is pointing to the right, drive the core further into the stable state in which it initially exists. These windings 80–87 will be referred to as inhibit windings, and the signals on them, as inhibit signals. A positive signal applied to a winding passing through a core will, if the arrow on that input winding is pointing to the left, drive the core towards its other stable state. It will be noted that the set line 88 attempts to switch all the cores to their other stable state and that all the other input windings 80–87, when energized, apply inhibit signals to selected ones of the cores. A signal inhibit signal applied to a core will prevent the core from being switched when a positive pulse is applied to the set winding. When a core is switched, an output signal appears on the output winding 19*o*–19*z* linking it. Each inhibit winding 80–87 is connected to one side of single-shot trigger 92.1–92.8. These triggers normally operate in their "0" condition causing positive levels to appear on inhibit windings 81, 83, 85 and 87. A positive pulse indicating a "1" on one of the input lines 16 (*a* or *b*) will switch the associated trigger 92.1–92.8 to its "1" condition; the positive level will then be shifted from the odd-numbered inhibit winding connected to the switched trigger to the even numbered inhibit winding so connected until the single-shot trigger returns to its normal condition.

In operation, some combination of binary inputs are applied to the input lines 16 to set up the triggers and cause inhibit signals to appear on appropriate inhibit windings 80–87. Whatever the combination of binary inputs, it will be found that there is one and only one core *o–z* which has no inhibit signals applied to it. When the binary input has been established, current is applied to set line 88. This current will switch only the core having no inhibit signals applied to it, causing an output to appear on the output winding 19*o*–19*z* linking this core. At a later time, the switched core is reset either by another winding on the core (not shown in the figure) or by reapplication of the biases.

The address decoder shown in FIG. 3 could be easily converted into a condition decoder by (*a*) supplying a second set of inhibit windings in addition to the set 81–87 shown in FIG. 3 and coded in a similar manner; (*b*) having this set of inhibit windings controlled by a set of single-shot triggers, the states of which are controlled by conditional signals from the computer, the programmer, etc., and (*c*) by connecting together all of the output windings 19*o*–19*z* with a common line 24 (*a* or *b*), (FIG. 1), and, if diodes are not already in the output windings, placing diodes in these windings to prevent spurious switching. With this structure, the condition would be met and a core switched to cause an output only if the core to which no inhibit signals are applied by the first set of inhibit windings 81–87 was the same as the core to which no inhibit signals are applied by the second set of inhibit windings. Otherwise, inhibit signals would be applied to all the cores, and, when the set signal is applied to the set line 88, no core can be switched. To increase the flexibility of the circuit, one of the codes into both the row condition decoder 22*a* and the column condition decoder 22*b* will be an unconditional branch. For this code, all of the inhibit signals for one of the sets of inhibit lines would be suppressed.

Figure 4:
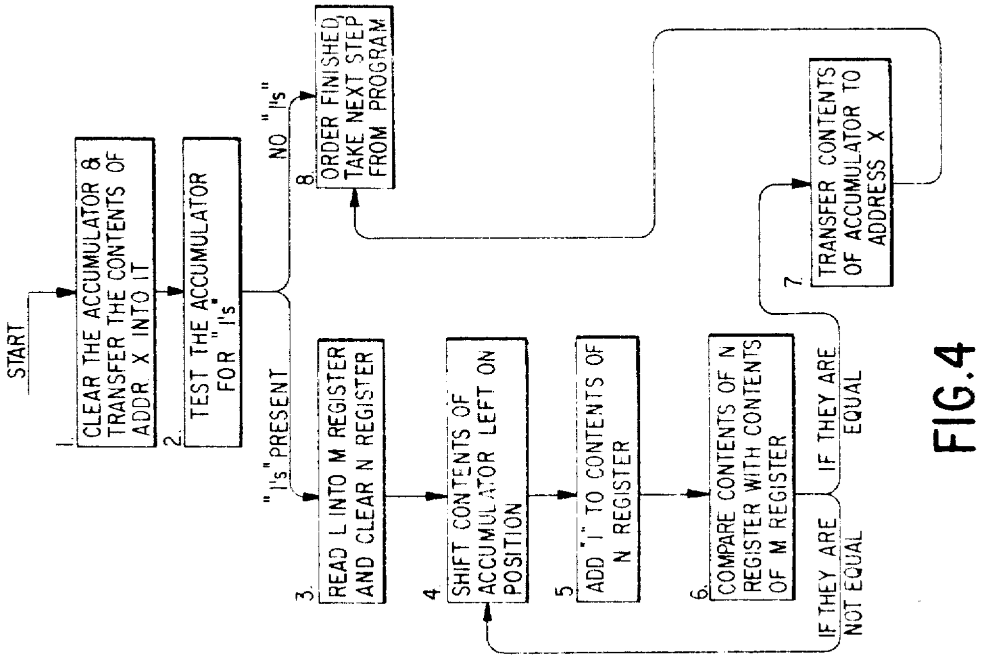
FIG. 4 is a flow diagram for a hypothetical illustrative program order.

Having described the structure of this invention in some detail, it is believed that the relationship of these components to each other can be better understood by observing how the circuit operates to perform a hypothetical illustrative program order. Suppose the program order is, "If the contents of address *x* is other than zero, shift the contents of this address, L places to the left; if the contents of address *x* is zero, go on to the next order." The flow diagram for a possible micro-program of this order is shown in FIG. 4.

The first step of this micro-program is to clear the accumulator and transfer the contents of address *x* into it. This step clearly requires several operations. An example of a possible sequence of operations would be, first, to clear the accumulator; second, to read the address portion of the order into some register; third, to transfer the contents of the address indicated in the above register to the accumulator. Since three operations are required, the selected core must have three of the 46 sense lines 14 (FIG. 1) passing through it.

Assume that core 12*a* (FIG. 2) is the core associated with step 1 of this micro-program. As mentioned above, this core would have three sense lines (one of which, 14*a*, is shown in FIG. 2) passing through it. Signals would be sent from the computer along lines 38*a* and 38*b* (FIG. 1) to saturate transistors 96 and 98 of drivers 28*a* and 28*b* respectively. Since triggers 26*a* and 26*b* (FIG. 1)

are ordinarily in their "0" condition, and since nothing has been done to switch these triggers, the NPN transistor of gate 29*a* will be cut off by the negative voltage applied to its base and the PNP transistor 66 of gate 29*b* will be turned on by the negative voltage applied to its base. (Conversely, the transistor of gate 30*a* will be turned on and the transistor 66 of gate 30*b* will be turned off.) Note that when the transistor of gate 29*a* is cut off, gate 29*a* is conditioned to cause the energization of the selected row drive winding of the set 31*u* as set forth below.

Since transistor 98 of driver 28*b* and transistor 66 of gate 29*b* are turned on, a constant current signal will flow from positive terminal 100 through transistors 66 and 68 of gate 29*b* through column drive winding 13 and through transistor 98 of driver 28*b* to minus terminal 102. This current flowing in the column drive winding has insufficient energy alone to switch any of the cores 12. However, just prior to the application of the input signal to transistor 98 of driver 28*b*, negative input pulses are applied to transistors 56 of bias source 34 to turn these transistors on. This causes current to flow in two paths. The first of these paths is from the source of positive potential 104 through the righthand leg of the bias source, through bias winding 54*f* and through the conducting transistor of gate 30*a* to the source of negative potential 106. This current will not flow through the diodes 52 and the lines M, N and O because, the terminal 106 being at a lower negative potential than the terminal 50, the diodes 52 are back-biased. The second path is from positive potential source 104 through the left leg of bias source 34, through bias winding 54*u*, through diode 52 and row drive winding C and through transistor 96 to the source of negative potential 50. The diode 52 in series with the row drive winding C is forward biased because the transistor of gate 29*a* is cut off and the anode of the diode is therefore at a positive potential. The bias current appearing on bias windings 54*u* and 54*f* prevent all cores having none or a single drive signal passing through them from switching. The only core having two drive signals passing through it is core 12*a* at the intersection of row winding C and column winding 13. This core, therefore, is the only one which is switched.

When core 12*a* is switched, three control pulses are sent to the timing gates 15 (FIG. 1). These pulses are passed under control of timing pulse generator 17 to the computer to cause the desired operation.

At the end of each step cycle, transistors 56 are again turned on as are the transistors of both gates 29*a* and 30*a*. This causes bias current to flow in both bias windings 54*a* and 54*f* to reset the switched core to its normal condition.

Since step 2 of the illustrative micro-program (FIG. 4) is always the same (no branching occurs after step 1) there will probably be no condition windings 20*a* or 20*b* passing through core 12*a* (an exception to this assumption will be presented later). There will, however, be a certain number of address windings 16*a* and 16*b* passing through core 12*a*, the number of these windings depending on the number of "1's" in the binary code for the address of the next core to be selected. Since the single-shot triggers 92.1–92.8 (FIG. 3) are ordinarily in their "0" condition, no signals need be applied to the address windings 16 (*a* or *b*) correpsonding to the "0's" in the binary address code and these windings need not pass through core 12*a*.

Assume that the decoder shown in FIG. 3 is the row-address decoder 18*a* (FIG. 1) and that an output is desired on output winding 19*r*. This would means that "1's" would appear on lines 1 and 2 of the line 16*a* and that triggers 92.1 and 92.2 would be switched to their "1" state. The decoder would then have positive potentials appearing on inhibit windings 80, 82, 85, and 87. It can be seen that with these inhibit windings energized, there will be at least one inhibit signal applied to every core in the decoder except core *r*. Therefore when a potential is applied to the set line 88, only core *r* will be switched, and an output will appear only on winding 19*r*.

The address decoders 18*a* and 18*b* will energize the appropriate drivers to select the control core 12 in core group 10*a* corresponding to step 2 of the micro-program. The actual procedure for selecting a core has already been described and will not be described again.

Since the next step to be performed in the micro-program will depend on the outcome of step 2, the control core corresponding to step 2 will have both condition windings 20*a* and/or 20*b* and address windings 16*a* and 16*b* passing through it. Since there are only two possible branches at this point in the micro-program, it is not necessary that both a row and a column condition be fulfilled. Therefore, to save windings, the core corresponding to step 3 would probably be in core group 10*a* while the core corresponding to step 8 would probably be in core group 10*b* or 10*c*. For the sake of illustration, it will be assumed that the core corresponding to the step 8 of the micro-program is in core group 10*b* and therefore that only row condition windings pass through the core corresponding step 2. If, as a result of step 2, it is determined that "1's" are present in the accumulator, the core in condition decoder 22*a* which has no inhibit signal applied to it by condition windings 20*a*, and the core which has no inhibit signals applied to it by the conditional signals from the computer will not be the same core. The trigger 26*a* will therefore remain in its zero condition and a core in core group 10*a* will be selected as for step 2 above. However, if no "1's" are detected in the accumulator, no useful function would be served by shifting L places, to the left, and the micro-program should branch to step 8. Therefore, when no "1's" are detected in the accumulator, the core in row condition decoder 22*a* which has no inhibit signals applied to it by the condition windings 20*a* is the same core as has no inhibit signals applied to it by the conditioned signals from the computer and an output signal is generated on line 24*a* to switch trigger 26*a* to its "1" condition. This causes the transistor of gate 29*a* (FIG. 2) to be turned on, and causes the transistor of gate 30*a* to be cut off. The procedure for selecting the desired control core in core group 10*b* is quite similar to that already discussed with reference to step 1 and will not be described here again. The switching of this core will return control to the program in a manner already described.

Assuming that a "1" was initially detected in the accumulator the micro-program will proceed on with steps 3, 4, 5 and 6. These steps are performed in a manner analogous to that already described with reference to steps 1 and 2 and no further description at this point is necessary. At the end of step 6, another branch occurs. Here again there are only two possible alternatives and, for the sake of illustration, assume that for this branch, the core corresponding to step 7 is in core group 10*c*. The core corresponding to step 6 of the micro-program would therefore have column condition windings 20*b* passing through it. The signals appearing on these windings would cause all but one of the cores in the column condition decoder 22*b* to be inhibited. If inhibit signals are applied to this core by the conditional signals into decoder 22*b* from the computer, trigger 26*b* will remain in its zero state and the micro-program will return to step 4 for another shift operation. However, if the required number of shifts have occurred, the same core will have no inhibit signals applied to it by both the condition windings 20*b* and the conditional signals from the computer and, when a set signal is applied to winding 88 (FIG. 3), an output signal will appear on winding 24*b* switching trigger 26*b* to its "1" state. This causes transistor 66 of gate 29*b* to be cut off and transistor 66 of gate 30*b* to be turned on. The desired core in core group 10*c* will be selected in a manner similar to that described.

After step 7 has been completed, it is desired to select the core corresponding to step 8. As has been mentioned before, this core is in core group 10*b*. It is therefore necessary to have row-conditional windings 20*a* passing through the core corresponding to step 7 even though no branch occurs after this step. Since it is desired to go to the core group 10*b* no matter what the condition of the computer is at that time, the code for the unconditional branch previously described will be used in this situation. Step 8 will then be performed as was described previously.

While the illustrative embodiment of this invention shown in FIG. 1 utizes a control matrix having four core groups, it can be seen from the above-described example that, if for any branch in the several micro-programs there are no more than two possible alternatives, the control matrix need only have two core groups. Therefore, the simplest embodiment of this invention would be one having two core groups, one condition decoder, one signal-shot trigger 26 and one set of gates 29 and 30. It can also be seen that, if for some micro-program branches there are six, eight, etc., possible alternatives, the cores could be divided into six, eight, etc., groups and suitable multistable devices substituted for the triggers 26*a* and 26*b*.

Also, it is not essential that the cores 12 be bistable; it is only essential that they have a first flux condition in which they normally exist, and a second flux condition to which they may be driven when drive currents are applied to both drive windings linking them. It is therefore possible to use transformer-type cores, these cores normally being set in a non-remanent condition and being driven to a saturated condition when a net positive drive signal is applied to them. Since the bias signal will cancel one of the inputs applied to a core, a core will be driven to its saturated condition only when both drive windings linking it are energized.

While the invention has been particularly shown and described with reference to a preferred embodiment thereof, it would be understood by those skilled in the art that the foregoing and other changes in form and details may be made therein without departing from the spirit and scope of the invention.

We claim:

1. A circuit for controlling micro-program steps in a computer comprising in combination a plurality of magnetic cores having at least one stable flux condition, said cores being arranged in rows and columns, all said cores being initially set to said stable condition; a plurality of first separately energizable drive means, one for each of said rows, and a plurality of second separately energizable drive means, one for each of said columns, a core being driven out of said stable condition only in response to the energization of both the row drive means and the columns drive means corresponding to it, at least one of said plurality of drive means being divided into sets, there being, for each drive means of a set, a drive means corresponding to it in each other set of the same plurality of drive means; output means responsive to a core being driven out of its stable condition for generating a set of output signals to the computer; set selecting means responsive to a core being driven out of its stable condition for determining the sets in which the next drive means to be selected will be located; and address selecting means responsive to a core being driven out of its stable condition for determining which particular drive means in the selected sets will be energized next.

2. A circuit for controlling micro-program steps in a computer comprising in combination a plurality of magnetic cores having a non-remanent condition in which they normally exist, and adapted to be driven out of said condition in response to anext drive signal applied to it, said cores being arranged in rows and columns; bias means for attempting to drive all said wires toward a first remanent condition; a plurality of first separately energizable drive means, one for each of said rows, and a plurality of second separately energizable drive means, one for each of said columns, said drive means being energized no sooner than said bias means to attempt to drive said cores to the opposite remanent condition, whereby a core will have a net drive signal applied to it only when the drive means and the column drive means corresponding to it are energized, at least one of said plurality of drive means being divided into sets, there being, for each drive means of a set, a drive means corresponding to it in each other set of the same plurality of drive means; output means responsive to a core being driven out of its non-remanent condition for generating a set of output signals to the computer; set selecting means responsive to a core being driven out of its non-remanent condition for determining the sets in which the next drive means to be selected will be located; and address selecting means responsive to a core being driven out of its non-remanent condition for determining which particular drive means in the selected sets will be energized next.

3. A circuit for controlling micro-program steps in a computer comprising in combination a plurality of magnetic cores capable of existing in either of two remanent conditions, said cores being arranged in rows and columns; a plurality of first separately energizable drive means, one for each of said rows, and a plurality of second separately energizable drive means, one for each of said columns, a core having its magnetic condition changed only in response to the energization of both the row drive means and the column drive means corresponding to it, at least one of said plurality of drive means being divided into sets, there being, for each drive means of a set, a drive means corresponding to it in each other set of the same plurality of drive means; output means responsive to a change in the magnetic condition of a core for generating a set of output signals to the computer; set selecting means responsive to a change in the magnetic condition of a core for determining the sets in which the next drive means to be selected will be located; and address selecting means responsive to a change in the magnetic condition of a core for determining which particular drive means in the selected sets will be energized next.

4. A circuit for controlling micro-program steps in a computer comprising in combination a plurality of magnetic cores capable of existing in either of two remanent conditions, said cores being arranged in rows and columns; means for initially setting said cores to one of said remanent conditions; a plurality of first separately energizable drive means, one for each of said rows, and a plurality of second separately energizable drive means, one for each of said columns, a core being transferred to the other of said remanent conditions only in response to the combined excitation of the row and column drive means corresponding to it, at least one of said plurality of drive means being divided into sets, there being for each drive means of a set, a drive means corresponding to it in each other set of the same plurality of drive means; output means responsive to the transfer of a core to the other of said remanent conditions for generating a set of output signals to the computer; set selecting means jointly responsive to the transfer of a core to the other of said remanent conditions and to external information signals for selecting the sets in which the next drive means to be selected will be located; and address selecting means responsive to the transfer of a core to the other of said remanent conditions for determining which drive means in the selected sets of drive means will be energized next.

5. A circuit for controlling the micro-program steps of a computer comprising in combination a plurality of magnetic cores capable of existing in either of two remanent conditions, said cores being arranged in rows and columns; means for initially setting said core to one of said remanent conditions; a plurality of first drive windings, one for each of said rows, and a plurality of second drive windings, one for each of said columns, a core being transferred to the other of said remanent conditions only in response to the combined excitation of the row and column drive windings corresponding to it, at least one of said plurality of drive windings being divided into sets, there being, for each drive winding of a given set, a drive winding corresponding to it in each other set of the same plurality of drive windings; a plurality of output windings each linking selected ones of said cores in a predetermined pattern, each of said output windings having induced therein an output signal to the computer each time a core it links has its remanent condition transferred; a plurality of condition windings each linking selected one of said cores in a predetermined pattern, first decoder means for comparing signals induced on the condition windings when a core they link has its remanent condition transferred with conditional signals from an external source and for generating an output signal only if the comparison is successful, means responsive to the output signal from said decoder means for determining in which sets the next drive windings to be selected will be located; a plurality of address windings each linking selected ones of said cores in a predetermined pattern, and second decoder means responsive to signals induced on said address windings when the cores they link have their remanent condition transferred for determining which drive windings in the selected sets will be energized.

6. A circuit for controlling micro-program steps in a computer comprising in combination a plurality of magnetic cores, each of said cores having a first and a second stable condition, said cores being arranged in rows and columns and divided into four groups, there being, for each core of a given group, a corresponding core in each other group; reset means for initially setting all said cores to said first stable condition; a plurality of first drive windings, one for each of said rows, and a plurality of second drive windings, one for each of said columns, a core being driven from said first to said second stable condition only in response to the combined excitation of the drive windings linking it; a plurality of first drive means, each capable of energizing a pair of first drive windings linking corresponding cores in each of the core groups; a plurality of second drive means, each capable of energizing a pair of second drive windings linking corresponding cores in each of the core groups; a plurality of output windings each linking selected ones of said cores in a predetermined pattern, each of said output windings having induced therein an output signal to the computer each time a core it links is switched from its first to its second stable condition; a plurality of condition windings each linking selected ones of said cores in a predetermined pattern, first decoder means for comparing signals induced on the condition windings when a core they link is switched from its first to its second stable condition with conditional signals from an external source for generating an output signal only if the comparison is successful, means responsive to the output signal from said decoder means for determining which group the next core to be selected will be located in; a plurality of address windings each linking selected ones of said cores in a predetermined pattern, and second decoder means responsive to signals induced on said address windings when the core they link is switched from its first to its second stable condition for determining which drive means will be the next to be selected.

References Cited by the Examiner

UNITED STATES PATENTS

| | | | |
|---|---|---|---|
| 2,802,203 | 8/1957 | Stuart-Williams | 340—174 |
| 3,027,546 | 3/1962 | Howes | 340—174 |
| 3,069,658 | 12/1962 | Kramskoy | 340—172.5 |

ROBERT C. BAILEY, *Primary Examiner.*

IRVING L. SRAGOW, *Examiner.*

R. J. McCLOSKEY, G. D. SHAW, *Assistant Examiners.*

UNITED STATES PATENT OFFICE
CERTIFICATE OF CORRECTION

Patent No. 3,273,126 September 13, 1966

Charles Edward Owen et al.

It is hereby certified that error appears in the above numbered patent requiring correction and that the said Letters Patent should read as corrected below.

Column 9, line 69, for "anext" read -- a net --.

Signed and sealed this 26th day of September 1967.

(SEAL)
Attest:

ERNEST W. SWIDER
Attesting Officer

EDWARD J. BRENNER
Commissioner of Patents